(12) United States Patent
Rautschek et al.

(10) Patent No.: US 8,907,011 B2
(45) Date of Patent: Dec. 9, 2014

(54) AQUEOUS DISPERSIONS OF ORGANOSILICON COMPOUNDS

(75) Inventors: Holger Rautschek, Nuenchritz (DE); Hartmut Ackermann, Burghausen (DE); Robert Schroeck, Altoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/009,603

(22) PCT Filed: Mar. 30, 2012

(86) PCT No.: PCT/EP2012/055819
§ 371 (c)(1),
(2), (4) Date: Oct. 3, 2013

(87) PCT Pub. No.: WO2012/136589
PCT Pub. Date: Oct. 11, 2012

(65) Prior Publication Data
US 2014/0020600 A1    Jan. 23, 2014

(30) Foreign Application Priority Data
Apr. 7, 2011 (DE) .......................... 10 2011 007 006

(51) Int. Cl.
| | |
|---|---|
| *C08L 83/06* | (2006.01) |
| *C08J 3/21* | (2006.01) |
| *C09D 5/00* | (2006.01) |
| *C08J 3/05* | (2006.01) |
| *C08L 83/04* | (2006.01) |
| *C08K 5/5419* | (2006.01) |
| *C08K 5/544* | (2006.01) |
| *C08G 77/20* | (2006.01) |
| *C08K 9/06* | (2006.01) |

(52) U.S. Cl.
CPC ............... *C09D 5/00* (2013.01); *C08K 5/5419* (2013.01); *C08K 5/544* (2013.01); *C08J 3/212* (2013.01); *C08G 77/20* (2013.01); *C08J 2383/05* (2013.01); *C08K 9/06* (2013.01); *C08J 3/05* (2013.01); *C08J 2383/07* (2013.01); *C08L 83/04* (2013.01)
USPC ....................................................... 524/858

(58) Field of Classification Search
CPC .......... C09D 5/022; C07F 7/18; C08G 77/16; C08K 3/36
USPC ..................................... 106/287.12; 524/858
See application file for complete search history.

(56) References Cited

U.S. PATENT DOCUMENTS

| | | |
|---|---|---|
| 3,048,499 A | 8/1962 | Jellinek et al. |
| 3,830,738 A | 8/1974 | Cottrell |
| 4,648,904 A | 3/1987 | DePasquale et al. |
| 5,091,002 A | 2/1992 | Schamberg et al. |
| 5,443,627 A | 8/1995 | Von Au et al. |
| 5,661,196 A | 8/1997 | Mayer et al. |
| 2009/0139434 A1* | 6/2009 | Rautschek et al. ........ 106/287.13 |

FOREIGN PATENT DOCUMENTS

| | | |
|---|---|---|
| DE | 1069057 | 11/1959 |
| DE | 2107082 | 8/1971 |
| EP | 0234024 A1 | 9/1987 |
| EP | 0392253 B1 | 1/1994 |
| EP | 0582611 B1 | 2/1994 |
| EP | 0609524 B1 | 8/1994 |
| EP | 1034209 | 9/2000 |
| WO | 2004109008 A1 | 12/2004 |

OTHER PUBLICATIONS

X. Guo, Z. Rong and X. Ying, Calculation of hydrophile-lipophile balance for polyethoxylated surfactants by group contribution method, Journal of Colloid and Interface Science 298, 2006, pp. 441-450, Elsevier Inc.
English Abstract on p. 901 of respective article: S. Schultz, G. Wagner and J. Ulrich, Hochdruckhomogenisation als ein Verfahren zur Emulsionsherstellung (High-pressure homogenization for emulsion formation), Chemie Ingenieur Technik (74), 2002, pp. 901-909, Wiley-VCH Verlag GmbH, Weinheim, Germany.

* cited by examiner

*Primary Examiner* — Kuo-Liang Peng
(74) *Attorney, Agent, or Firm* — Brooks Kushman P.C.

(57) ABSTRACT

Stable aqueous organosilicon dispersions particularly useful for the hydrophobing of construction materials are prepared by first preparing a homogenous mixture of organopolysiloxanes and hydrophobic silica filler, and dispersing this mixture together with an alkylalkoxysilane bearing at least one $C_4$ or greater alkyl group into water.

8 Claims, No Drawings

AQUEOUS DISPERSIONS OF ORGANOSILICON COMPOUNDS

CROSS-REFERENCE TO RELATED APPLICATIONS

This application is the U.S. National Phase of PCT Appln. No. PCT/EP2012/055819 filed Mar. 30, 2012, which claims priority to German Application No. 10 2011 007 006.0 filed Apr. 7, 2011, the disclosures of which are incorporated in their entirety by reference herein.

BACKGROUND OF THE INVENTION

1. Field of the Invention

The invention relates to aqueous dispersions of organosilicon compounds, to processes for production thereof and to the use thereof, especially for hydrophobizing impregnation and bulk hydrophobization of mineral and organic building materials.

2. Description of the Related Art

Silanes and siloxanes have long been used for architectural protection, for example solutions of silanes in organic solvents as described, for example, in DE-A 1069057. For reasons of cost, but not least also because of the hazards to health when handling organic solvent and the associated environmental pollution, working with organic solvents is disadvantageous.

Aqueous formulations based on alkylalkoxysilanes and -siloxanes are known. EP-A 234 024 describes silane emulsions comprising nonionic emulsifiers having an HLB value of 4 to 15. EP-B 392 253 describes aqueous formulations comprising mixtures of alkoxysilane and alkoxysiloxanes. The addition of hydrophobic fillers, such as hydrophobic silica, can improve the bead-off effect of these formulations. However, no statement is made as to the stability of the emulsions on addition of hydrophobic silica. EP-B 582 611 too uses hydrophobic silica, without making any statements as to storage stability. If self-dispersing compositions are formulated with siloxanes having a high proportion of basic nitrogen, even a hydrophobic silica is stably dispersible (EP-B 609 524). However, such formulations tend to yellow and become discolored on use because of the amine content.

SUMMARY OF THE INVENTION

The invention provides aqueous dispersions of organosilicon compounds, producible using
(A) a mixture consisting essentially of inorganic filler (B) and siloxane (C) containing units of the formula

$$R_a(R^1O)_b SiO_{(4-a-b)/2} \quad (I)$$

in which
R may be the same or different and is a hydrogen atom or a monovalent, SiC-bonded, optionally substituted hydrocarbyl radical,
R may be the same or different and is a hydrogen atom or a monovalent, optionally substituted hydrocarbyl radical,
a is 0, 1, 2 or 3, preferably 1, 2 or 3, and
b is 0, 1, 2 or 3, preferably 0 or 1, with the proviso that the sum of a and b is less than or equal to 3, having a viscosity at 25° C. of 5 to 1,000,000 mPas,
the mixture (A) having a viscosity of 10 to 10,000,000 mPas at 25° C.,
(D) silanes of the formula

$$R^3_c R^2_d Si(OR^4)_{4-c-d} \quad (II)$$

in which
$R^2$ may be the same or different and denotes monovalent, SiC-bonded, optionally substituted hydrocarbyl radicals having 1 to 3 carbon atoms,
$R^3$ may be the same or different and denotes monovalent, SiC-bonded, optionally substituted hydrocarbyl radicals having at least 4 carbon atoms, which may be interrupted by heteroatoms and/or carbonyl groups,
$R^4$ may be the same or different and denotes monovalent, optionally substituted hydrocarbyl radicals or hydrogen,
c is 1, 2 or 3, preferably 1, and
d is 0, 1 or 2, preferably 0 or 1, with the proviso that the sum of c and d is 1, 2 or 3, and/or partial hydrolyzates thereof, optionally
(E) organopolysiloxanes,
(F) emulsifier,
(G) water and
optionally
(H) further substances.

The invention further provides a process for producing aqueous dispersions of organosilicon compounds, in which mixture (A) produced by mixing inorganic filler (B) and siloxane (C) containing units of the formula (I) having a viscosity at 25° C. of 5 to 1,000,000 mPas, mixture (A) having a viscosity of 10 to 10,000,000 mPas at 25° C., is mixed with
(D) silanes of the formula (II) and/or partial hydrolyzates thereof,
optionally
(E) organopolysiloxanes,
(F) emulsifier,
(G) water and optionally
(H) further substances.

DETAILED DESCRIPTION OF THE PREFERRED EMBODIMENTS

In the context of the present invention, the term "organopolysiloxanes" shall encompass polymeric, oligomeric, and also dimeric, siloxanes.

Examples of the fillers (B) used in accordance with the invention are precipitated or fumed silicas, titanium dioxide or aluminum oxide.

The fillers (B) used in accordance with the invention may be either hydrophobic or hydrophilic, filler (B) preferably being hydrophobic. There are many known processes for hydrophobization of fillers, especially silicas.

Filler (B) preferably comprises silicas, more preferably precipitated or fumed silicas.

Preferably, component (B) has a BET surface area of 20 to 1000 m²/g, more preferably 50 to 800 m²/g, especially of 100 to 400 m²/g.

Fillers (B) preferably have a particle size of less than 10 μm, more preferably 10 nm to 1 μm.

Fillers (B) preferably have an agglomerate size of less than 100 μm, more preferably 100 nm to 10 μm.

If hydrophobic silica is to be used as component (B), this may be hydrophobized silica, for example commercially available pretreated silica. However, the hydrophobization can alternatively also be effected in situ during the production of mixture (A).

The in situ hydrophobization of the hydrophilic silica can be effected by known processes, for example by heating the silica with silazanes for several hours to temperatures of 100 to 200° C., optionally with addition of catalysts.

The hydrophobic silica used with preference as component (B) preferably has a carbon content of 0.1 to 5.0% by weight, especially of 0.5 to 3% by weight.

The hydrophobic silica used with preference as component (B) exhibits a hydrophobicity, according to the methanol titration test described in DE-A 2107082, page 3 paragraph 2, of preferably greater than 30, more preferably greater than 50, especially 50 to 70.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the β- and β-phenylethyl radicals.

Examples of substituted R radicals are hydrocarbyl radicals substituted by halogen atoms, amine radicals, glycidoxy radicals or mercapto radicals, for example the trifluoropropyl radical, the aminopropyl radical, the aminoethylaminopropyl radical, the glycidoxypropyl radical and the mercaptopropyl radical.

Preferably, the R radical comprises hydrocarbyl radicals which have 1 to 18 carbon atoms and are optionally substituted by oxygen- or nitrogen-containing groups, more preferably alkyl radicals having 1 to 18 carbon atoms or aromatic hydrocarbyl radicals having 6 to 9 carbon atoms, most preferably methyl, n-hexyl, n-heptyl, n-octyl, isooctyl, n-dodecyl, phenyl and ethylphenyl radicals, and most preferably the methyl radical.

Preferably, the $R^1$ radical is hydrogen or an alkyl radical having 1 to 4 carbon atoms, optionally substituted by organyloxy groups, more preferably a hydrogen or the methyl, ethyl, n-butyl, i-propyl and 2-methoxyethyl radicals, especially a hydrogen atom or the methyl or ethyl radicals.

The siloxane (C) containing units of the formula (I) used in accordance with the invention preferably comprises those consisting of units of the formula (I), more preferably essentially linear organopolysiloxanes, especially linear organopolysiloxanes with triorganylsilyl or hydroxydiorganylsilyl end groups.

The essentially linear siloxanes (C) used in accordance with the invention may, as a result of the preparation, have a molar proportion of branches, i.e. T and/or Q units, of preferably up to 1%, more preferably up to 1000 ppm.

Examples of the siloxanes (C) used in accordance with the invention are polydimethylsiloxanes having trimethylsilyl end groups, polydimethylsiloxanes having vinyldimethylsilyl end groups and polydimethylsiloxanes having hydroxydimethylsilyl end groups.

The siloxanes (C) used in accordance with the invention preferably have a viscosity at 25° C. of 50 to 50,000 mPas, more preferably of 100 to 10,000 mPas.

Compounds containing units of the formula (I) are commercially available or can be prepared by commonly known chemical methods.

The mixture (A) used in accordance with the invention comprises filler (B), preferably in amounts of 1 to 60 parts by weight, more preferably 10 to 50 parts by weight, especially 10 to 35 parts by weight, based in each case on 100 parts by weight of mixture (A).

The mixture (A) used in accordance with the invention may, as well as filler (B) and siloxane (C), comprise up to a content of 5% by weight of further constituents, for example preparation-related impurities such as cyclic siloxanes, water and residues of catalysts, but this is not preferable.

For production of the mixture (A) used in accordance with the invention, filler (B) is mixed together with siloxane (C) by processes known per se, for example in kneaders, dissolvers, or colloid mills. Preferably, filler (B) is first mixed vigorously with a portion of the siloxane (C) and then diluted with further siloxane (C).

The production of the mixture (A) is preferably performed at temperatures of 0 to 250° C., more preferably 5 to 200° C., especially 20 to 150° C., and a pressure of the surrounding atmosphere, i.e. between 900 and 1100 hPa.

In the course of production of the mixture (A), a mixing energy of preferably more than 3.0 kJ/kg, more preferably more than 8 kJ/kg, especially 10 to 150 kJ/kg, is introduced.

The mixture (A) used in accordance with the invention is preferably a homogeneous dispersion.

Mixture (A) preferably has a viscosity at 25° C. of 1000 to 1,000,000 mPas, more preferably 10,000 to 200,000 mPas.

Preferably, the dispersion (A) used in accordance with the invention has viscoelastic properties, determined by oscillating viscosity measurement according to DIN 54458, draft of January 2010. The storage modulus of these dispersions (A) at an amplitude of 1% and an angular frequency of 100/s and a temperature of 25° C. is preferably more than 10 Pa, more preferably 10 Pa to 10,000 Pa, and especially 200 Pa to 1000 Pa. These dispersions (A) may have a yield point, determined to DIN 54458, of preferably at least 1 Pa, more preferably 1 Pa to 1000 Pa, especially 5 Pa to 50 Pa.

The mixture (A) used in accordance with the invention can be produced by known processes, for example by kneading, or with dissolver stirrers, rotor-stator homogenizers or roll kneaders. In a preferred procedure, a portion of the siloxane (C) is first mixed with all of the filler (B), and then the mixture is mixed stepwise with further siloxane (C). If the filler (B) used is a hydrophilic silica, this has to be hydrophobized in situ in the course of production of mixture (A). Processes for in situ hydrophobization are known to those skilled in the art, for example from processes for production of silicone rubbers or silicone antifoams. The hydrophobization of components (B) can be effected by simple heating to preferably 100 to 180° C. with component (C), in which case, for example, the reaction can be promoted with catalysts such as acids or bases, for example by means of KOH. Preference is given, however, to using low molecular weight hydrophobizing agents such as cyclic siloxanes, e.g. octamethylcyclotetrasiloxane, silanes, for example dimethyldichlorosilane or dimethyldimethoxysilane, or silazanes such as hexamethyldisilazane. Particular preference is given to effecting the in situ hydrophobization with hexamethyldisilazane in the presence of 0.1 to 1 part water per part hexamethyldisilazane at preferably 100 to 200° C., especially 120 to 180° C., for 20 minutes to 10 hours, especially 1 to 5 hours.

The inventive dispersions preferably comprise mixture (A) in amounts of 2 to 40% by weight, more preferably 10 to 25% by weight, based in each case on the total amount of the dispersion.

Examples of the $R^3$ radical are the radicals having at least 4 carbon atoms specified for the R radical.

Examples of substituted $R^3$ radicals are the aminoethylaminopropyl, glycidoxypropyl and methacryloylpropyl radicals.

The $R^3$ radical preferably comprises hydrocarbyl radicals which have 6 to 18 carbon atoms, may be interrupted by O, N, S or C=O and are optionally substituted by hydroxyl, alkoxy, ester, epoxy or amino groups, more preferably alkyl radicals, especially the n-hexyl n-octyl and isooctyl radicals, such as the 2,2,4-trimethylpentyl radical, n-decyl radical, n-dodecyl radical, n-tetradecyl radical, n-hexadecyl radical and octadecyl radical.

The $R^4$ radical preferably comprises optionally substituted alkyl radicals having 1 to 4 carbon atoms, more preferably the methyl, ethyl, n-butyl, 2-methoxyethyl or isopropyl radical, especially the ethyl radical.

Preferably, the $R^2$ radical comprises alkyl radicals having 1 to 3 carbon atoms, such as the methyl, ethyl, n-propyl and isopropyl radicals, more preferably the methyl radical.

Examples of silanes (D) used in accordance with the invention are isobutyltriethoxysilane, hexyltriethoxysilane, hexylmethyldiethoxysilane, n-octyltrimethoxysilane, n-octyltriethoxysilane, n-octyltributoxysilane, isooctyltriethoxysilane, n-decyltriethoxysilane, dodecylmethyldimethoxysilane, hexadecyltrimethoxysilane, octadecylmethyldimethoxysilane, octadecylmethyldiethoxysilane and octadecyltriethoxysilane and also aminoethylaminopropyltriethoxysilane, glycidoxypropyltrimethoxysilane and methacryloylpropyltriethoxysilane.

Preferably, component (D) comprises n-hexyltriethoxysilane, n-octyltriethoxysilane and isooctyltriethoxysilane, and the partial hydrolyzates thereof, particular preference being given to n-octyltriethoxysilane and isooctyltriethoxysilane and the partial hydrolyzates thereof.

If component (D) comprises partial hydrolyzates, preference is given to those having 2 to 10 silicon atoms. Partial hydrolyzates usually form through elimination of some of the $OR^4$ radicals in the silanes of the formula (II) by reaction with water or water vapor, forming silicon-bonded OH groups. These can in turn condense with elimination of water to give siloxane bonds, which give rise to oligomers which may also contain OH groups as well as $OR^4$ groups. Partial hydrolyzates of silanes of the formula (II) may also be present as an impurity in the silane of the formula (II).

The inventive dispersions preferably comprise component (D) in amounts of 5 to 1500 parts by weight, more preferably 100 to 500 parts by weight, based in each case on 100 parts by weight of mixture (A).

The siloxanes (E) used in accordance with the invention may be any desired linear, cyclic and branched siloxanes known to date.

The siloxanes (E) are preferably those which consist of units of the formula (I).

Examples of linear siloxanes (E) optionally used are polydimethylsiloxanes which are terminated by triorganosilyloxy groups and may contain hydroxyl groups and/or aminoalkyl groups, and also the examples mentioned for siloxane (C).

The linear siloxanes (E) have a viscosity at 25° C. of preferably 10 to 1,000,000 mPas, more preferably 30 to 10,000 mPas.

More particularly, the linear siloxanes (E) may be polydimethylsiloxanes terminated by hydroxyl groups having a viscosity of 20 to 200 mPas, or polydimethylsiloxanes bearing aminoethylaminopropyl groups having a viscosity of 100 to 5000 mPas.

Examples of cyclic siloxanes (E) optionally used are octamethylcyclotetrasiloxane, decamethylcyclopentasiloxane and dodecamethylcyclohexasiloxane.

Examples of branched siloxanes (E) optionally used are organopolysiloxanes bearing alkoxy groups, which are preparable, for example, by reaction of methyltrichlorosilane and optionally other alkyltrichlorosilanes or phenyltrichlorosilane with ethanol in water and satisfy empirical formulae such as $CH_3Si(OCH_2CH_3)_{0.8}O_{1.1}$ or $C_6H_5Si(OCH_2CH_3)_{0.7}O_{1.2}$, oligomeric siloxanes which are obtainable by hydrolysis/condensation from methyltriethoxysilane and isooctyltriethoxysilane and satisfy, for example, the formula $([MeSiO_{3/2}]_{0.3-0.5}[IOSiO_{3/2}]_{0.02-0.2}[EtO_{1/2}]_{0.3-0.6})_x$, where Me is a methyl radical, IO is an isooctyl radical and Et is an ethyl radical, and x is the degree of condensation, and silicone resins formed from units of the formula (I) in which a=1 in at least 70% of the units of the formula (I) and a=2 in the other units of the formula (I), preferably silicone resins in which a=1 in at least 80% of the units of the formula (I), especially 90% of the units of the formula (I), having a content of alkoxy groups of 1 to 6% by weight and of hydroxyl groups of 0.2 to 1% by weight.

The branched siloxanes (E) used are either solids at 25° C. and 1000 hPa or have a viscosity at 25° C. of preferably 10 to 1,000,000 mPas, more preferably 100 to 100,000 mPas, especially 1000 to 50,000 mPas, or a weight-average molar mass Mw of preferably 1000 to 100,000 g/mol, more preferably 2000 to 10,000.

The silicone resins (E) used in accordance with the invention may be either solid or liquid at 23° C. and 1000 hPa, preference being given to liquid silicone resins (E).

Preferably, any siloxanes (E) used are silicone resins, particular preference being given to mixtures of high-viscosity silicone resins with low-viscosity silicone resins or silicone oils. These mixtures have a viscosity at 25° C. of preferably 100 to 100,000 mPas, especially 1000 to 10,000 mPas.

If the inventive dispersions comprise siloxanes (E), the amounts are preferably 5 to 1000 parts by weight, more preferably 50 to 200 parts by weight, based in each case on 100 parts by weight of mixture (A).

The emulsifiers (F) used may be any emulsifiers which have also been used to date for the production of siloxane dispersions. The emulsifiers (F) used may be anionic, nonionic, cationic and amphoteric surfactants, or mixtures thereof. Alternatively, it is also possible to use polymeric compounds having emulsifying properties, such as polyvinyl alcohols, especially polyvinyl alcohols having a hydrolysis level of 75-95%.

Any component (F) used preferably comprises nonionic emulsifiers or mixtures of nonionogenic emulsifiers and ionic emulsifiers.

Examples of the nonionic emulsifiers (F) used in accordance with the invention are sorbitan fatty acid esters, ethoxylated sorbitan fatty acid esters, ethoxylated fatty acids, ethoxylated linear or branched alcohols having 10 to 20 carbon atoms, ethoxylated alkylphenols, pentaerythrityl fatty acid esters, glyceryl esters and alkyl polyglycosides.

Preferably, the nonionic emulsifiers (F) are sorbitan fatty acid esters, ethoxylated sorbitan fatty acid esters, ethoxylated fatty acids, ethoxylated linear or branched alcohols having 10 to 20 carbon atoms and ethoxylated triglycerides.

Preferably, the inventive dispersions do not comprise any ethoxylated alkylphenols, since these are known not to be environmentally compatible.

If nonionic emulsifiers are used as component (F), they may be just one kind of nonionogenic emulsifier or be a mixture of a plurality of nonionogenic emulsifiers. Preferably, at least one nonionic emulsifier (F) has an HLB value of greater than or equal to 12, especially greater than or equal to 14.

Preference is given to using, as component (F), mixtures of nonionogenic emulsifiers, of which at least one emulsifier has an HLB value greater than or equal to 12. In this case, the proportion of emulsifiers (F) having an HLB value greater than or equal to 12 in the emulsifier mixture (F) is preferably at least 30% by weight.

The HLB value is an expression of the equilibrium between hydrophilic and hydrophobic groups in an emulsifier. The definition of the HLB value and processes for determination thereof are common knowledge and are described, for example, in Journal of Colloid and Interface Science 298 (2006) 441-450 and the literature cited therein.

The anionic emulsifiers (F) used may, for example, be alkyl sulfonates, alkyl sulfates and alkyl phosphates.

Examples of cationic emulsifiers (F) are all known quaternary ammonium compounds which bear at least one substituted or unsubstituted hydrocarbyl radical having at least 10 carbon atoms, such as dodecyldimethylammonium chloride, tetradecyltrimethylammonium bromide, stearyltrimethylammonium chloride, distearyldimethylammonium chloride, cetyltrimethylammonium chloride, behenyltrimethylammonium bromide, dodecylbenzyldimethylammonium chloride and benzyltrimethylammonium chloride.

If cationic emulsifiers are used as component (F), these are preferably aryl- or alkyltrimethylammonium salts such as stearyltrimethylammonium chloride and cetyltrimethylammonium chloride, more preferably benzyltrialkylammonium salts, especially trimethylbenzylammonium chloride and trimethylbenzylammonium methosulfate.

Further examples are all known quaternary imidazolinium compounds which bear at least one substituted or unsubstituted hydrocarbyl radical having at least 10 carbon atoms, such as 1-methyl-2-stearyl-3-stearylamidoethylimidazolinium methosulfate, 1-methyl-2-norstearyl-3-stearylamidoethylimidazolinium methosulfate, 1-methyl-2-oleyl-3-oleylamidoethylimidazolinium methosulfate, 1-methyl-2-stearyl-3-methylimidazolinium methosulfate, 1-methyl-2-behenyl-3-methylimidazolinium methosulfate and 1-methyl-2-dodecyl-3-methylimidazolinium methosulfate.

For production of the inventive dispersions, component (F) is preferably used in amounts of 0.1 to 15% by weight, more preferably 0.3 to 8% by weight, based in each case on the total amount of the dispersion.

The water (G) used in accordance with the invention may comprise any kind of water, for instance natural waters, for example rain water, ground water, spring water, river water and sea water, chemical waters, for example demineralized water, distilled or (multiply) redistilled water, water for medical or pharmaceutical purposes, for example purified water (Aqua purificata; Pharm. Eur. 3), Aqua deionisata, Aqua destillata, Aqua bidestillata, Aqua ad injectionam or Aqua conservata, drinking water according to German drinking water legislation, and mineral waters.

The water (G) used in accordance with the invention is preferably water having a conductivity of less than 10 µS/cm, especially less than 2 µS/cm.

The dispersions produced in accordance with the invention comprise component (G) in amounts of preferably 10 to 95% by weight, more preferably 30 to 60% by weight, based in each case on the total amount of dispersion.

In one variant of the present invention, component (G) is present to an extent of less than 30%, such that firm creamy products are obtained, which are advantageous especially wherever impregnation on vertical or horizontal areas overhead is to be processed. It is a feature of these inventive creams that they have a yield point, determined by oscillating viscosity measurement to DIN 54458, of at least 5 Pa, especially at least 10 Pa.

Any further components (H) used in accordance with the invention may be any additives which have also been used to date in aqueous dispersions, for example thickeners, organosilicon compounds different than components (C), (D) and (E), catalysts, substances for adjusting the pH, fragrances, dyes, antifreezes such as glycols and glycol ethers, and preservatives.

Examples of thickeners (H) optionally used are polyacrylic acid, polyacrylates, cellulose ethers such as carboxymethyl cellulose and hydroxyethyl cellulose, natural gums such as xanthan gum, and polyurethanes.

Examples of organosilicon compounds (H) optionally used are silanes of the formula (II) where c=0, for instance tetraethoxysilane, trimethylmethoxysilane, aminopropyltriethoxysilane and aminopropylmethyldimethoxysilane.

Examples of catalysts (H) optionally used are amines and organometallic compounds, for example dibutyltin dilaurate.

Examples of substances for adjusting the pH (H) optionally used are, as well as aminosilanes, also amines, for example monoethanolamine, or alkali metal hydroxides. If necessary, in order to ensure the constancy of the pH over a prolonged period, it is also possible to use buffer systems, such as salts of acetic acid, salts of phosphoric acid, salts of citric acid, in each case in combination with the free acid, according to the desired pH.

Preferably, any component (H) used comprises amines and aminosilanes, more preferably triethanolamine.

If the inventive dispersions are produced using component (H), the amounts are preferably 0.01 to 5% by weight, more preferably 0.1 to 0.5% by weight, based in each case on the total amount of the dispersion. The inventive dispersions preferably comprise component (H).

The inventive dispersions are preferably free of water-immiscible solvents, or contain water-immiscible solvents in amounts of not more than 1% by weight, based on the total amount of the dispersion.

"Water-immiscible solvents" in the context of the present invention are understood to mean all solvents which are soluble with water in amounts of not more than 1 g/l at 20° C. and a pressure of 101.325 kPa. More particularly, these water-immiscible solvents at 20° C. have a vapor pressure of 0.1 kPa or higher. Examples of such water-immiscible solvents are benzene, toluene, xylene, hexane, cyclohexane and paraffinic hydrocarbon mixtures.

Preferably, the inventive dispersions do not comprise any components over and above components (A) to (H).

The components used in accordance with the invention may each be one kind of such a component or a mixture of at least two kinds of a particular component.

The inventive aqueous dispersions can be produced by processes known per se. Typically, the production is effected by simple stirring of all constituents at temperatures of preferably 1 to 50° C. and optionally subsequent homogenization, for example with jet dispersers, rotor-stator homogenizers at peripheral speeds of preferably 5 to 40 m/s, colloid mills or high-pressure homogenizers at homogenizing pressures of preferably 50 to 2000 bar.

In a preferred embodiment of the process according to the invention, components (C) and (B) are mixed homogeneously in a suitable mixer, for example a kneader. This mixture (A) is then added with component (D), optionally components (E) and optionally components (H) to a mixture of components (F) and (G), with variable mixing sequence. The components used are preferably mixed with a high-speed stirrer, for example a dissolver disk or a rotor-stator homogenizer. This is preferably followed by homogenizing with a high-pressure homogenizer.

In a particularly preferred embodiment of the process according to the invention, components (F) and a portion of component (G) are initially charged, components (A), (D), optionally (E) and optionally (H) are added successively or together and mixed homogeneously, and then the residual amounts of components (G) are added, mixed and homogenized.

Homogenizing techniques including high-pressure homogenizers are common knowledge. In this regard, reference is made, for example, to Chemie Ingenieur Technik, 74(7), 901-909 2002.

The inventive dispersions are preferably milky, white to beige liquids.

The inventive dispersions have a pH of preferably 5 to 9, especially of 6 to 8.

The inventive dispersions have a proportion of nonvolatile compounds (for example determined to ASTM D 5095) of preferably 10 to 90% by weight, more preferably of 20 to 70% by weight.

The inventive dispersions have a volume-average particle size of preferably 0.1 to 10 µm, especially of 0.3 to 1.5 µm.

The dispersity of the inventive dispersions is in the range from preferably 0.5 to 5, more preferably 1.5 to 3. This value is calculated from $(D_{90}-D_{10})/D_{50}$ where $D_x$ represents the particle size at which x % of the volume of the inner phase is present in particles smaller than or equal to this particle size, measured by the principle of Fraunhofer diffraction in accordance with ISO 13320.

The inventive dispersions have a viscosity of preferably less than 10,000 mPas, especially less than 1000 mPas, in each case measured at 25° C.

The inventive dispersions have the advantage of having a very high storage stability, not causing any discoloration, being producible inexpensively, being easy to handle, and of having very high storage stability even in dilue form.

The process for producing the inventive dispersions has the advantage that it is easy to perform and can be employed within a wide volume range, from the laboratory to the industrial scale.

The inventive dispersions have the advantage of showing very good and stable impregnating action and very good penetration characteristics on different substrates.

The inventive aqueous dispersions can be used for all purposes for which dispersions based on organosilicon compounds have also been used to date. They are, for example, of excellent suitability as architectural protection compositions, more particularly for hydrophobization of various mineral or organic substrates. The manner in which such dispersions are used is known to those skilled in the art.

The present invention further provides a process for treatment of substrates, characterized in that the substrates are contacted with the inventive dispersions.

Examples of substrates which can be treated with the inventive dispersions are mineral substances, such as brickwork, mortar, tiles, limestone, marble, sand-lime brick, sandstone, granite, porphyry, concrete and porous concrete, organic substances such as wood, paper, board, textiles, synthetic and natural fibers.

In general, the dispersions in the process according to the invention penetrate into the capillaries of the substrate and dry therein.

Preferably, in the process according to the invention, mineral substrates and wood materials are used.

The inventive treatment preferably involves impregnation, coating, priming and injecting, more preferably impregnation, in which case, more particularly, the substrate is contacted with the dispersion and the dispersion penetrates partially or fully into the substrate.

The inventive impregnation is preferably hydrophobic impregnation, and can be effected as an impregnation of the surface or else as an injection or as a bulk hydrophobization.

The bulk hydrophobization of concrete effected with the dispersions produced in accordance with the invention allows, for example, better demolding because of the improved bead-off effect.

The inventive hydrophobization drastically reduces the water absorption of the substrate, which lowers the thermal conductivity, but also prevents the destruction of the building materials through the influence of frost and thaw cycles or salt, or else, in the case of wood materials, through decay or fungal infestation. Thus, not only is the intrinsic value of the material thus treated assured, but also, for example, low energy consumption in heating or air conditioning.

For the inventive impregnation applications, the inventive dispersions are applied to the surface of the substrate by standard methods known to date for distribution, for example by painting, spraying, knife-coating, rolling, casting, smoothing, dipping and roll-coating. For brickwork treatment, it is necessary that the formulations penetrate well into the brickwork. Therefore, preference is given to low-viscosity dispersions for brickwork treatment. The property of penetrating into the brickwork may be a material property, or the penetration is promoted artificially by conveying the dispersions into the brickwork at elevated pressure.

The inventive dispersions can also be used for formulation of paints in combinations with organic dispersions and pigments, in order to impart hydrophobic properties to these paints. This application can also be effected in combination with organofluorine polymer dispersions, for example when not only a water-repellent effect but also an oil- and soil-repellent effect is desired, for example in order to prevent damage to the building by graffiti.

In the process according to the invention, according to the substrate and the intended effect, the inventive dispersion can be applied in concentrated form or else diluted with water. If the inventive application is to be effected in dilute form, the content of component (A) in the dispersion applied is preferably 2 to 35% by weight, especially 5 to 20% by weight.

The process for treatment of substrates has the advantage of being efficient and inexpensive, and that the substrates are given long-term protection from the influence of water.

In the examples which follow, all figures given for parts and percentages, unless stated otherwise, are based on weight. Unless stated otherwise, the examples which follow are conducted at a pressure of the surrounding atmosphere, i.e. at about 1000 hPa, and at room temperature, i.e. about 20° C. or a temperature which is established on combination of the reactants at room temperature without additional heating or cooling.

To test quality and stability, the following tests of the emulsion were conducted:

Particle size measurement (D[4,3]=volume-average particle size) was conducted with a Malvern Mastersizer X (Malvern Instruments GmbH, Herrenberg, Germany; measurement principle: Fraunhofer diffraction in accordance with ISO 13320.

Stability in the course of centrifuging (1 h at 4000 revolutions per min, which corresponds to a stress of 2500 times the force of gravity), visual assessment of water or oil depositions, or the creaming of the emulsion with estimation of the percentage.

Stability in the course of heated storage in a closed vessel at 50° C. for 14 d, measurement of the particle size and visual assessment of water or oil depositions, or the creaming of the emulsion with estimation of the percentage and determination of the molar proportion of alkyltrialkoxysilane, based on the sum total of the silicon in silanes and siloxanes compared to the proportion prior to heated storage by quantitative $^{29}$Si NMR analysis.

Me hereinafter denotes the methyl radical.

Example 1

Production of the Mixture of Siloxane and Hydrophobic Filler (Dispersion A1)

100 parts of polydimethylsiloxane having dimethylvinyl end groups with a viscosity of 1000 mPas and 95 parts of a hexadimethyldisilazane-treated silica having a BET surface area of 130 m$^2$/g, a carbon content of 2.1% and a hydrophobicity by methanol titration of 62 were mixed in a kneader until the mixture is homogeneous. This mixture was mixed homogeneously in the same kneader with a further 100 parts of polydimethylsiloxane with vinyldimethyl end groups having a viscosity of 1000 mPas. The mixture had a viscosity of 73,000 mPas (Brookfield viscometer). The storage modulus at 100/s and an amplitude of 1% was 590 Pa; the yield point was 9 Pa (measured to DIN 54458).

Example 2

Production of the Mixture of Siloxane and Hydrophilic Filler with In Situ Hydrophobization (Dispersion A2)

100 parts of polydimethylsiloxane with trimethyl end groups and with a viscosity of 1500 mPas and 70 parts of a hydrophilic silica having a BET surface area of 200 m$^2$/g were mixed in a kneader under a nitrogen blanket until the mixture is homogeneous. Subsequently, 2.5 parts of hexamethyldisilazane and 1 part of water were mixed in, and the mixture was heated to 150° C. for 2 h and cooled to 90° C., a further 8 parts of hexamethyldisilazane and 74 parts of polydimethylsiloxane with trimethyl end groups and with a viscosity of 1500 mPas were added, mixed homogeneously and heated for 4 h. The mixture thus obtained had a viscosity of 98,000 mPas (Brookfield viscometer). The storage modulus at 100/s and an amplitude of 1% was 780 Pa; the yield point was 13 Pa (measured to DIN 54458).

Example 3

0.75 part of an ethoxylated isotridecyl alcohol with 5 ethylene glycol groups (HLB=11.2, obtainable under the tradename Lutensol TO 5 from BASF SE, Ludwigshafen, Germany) and 1.875 parts of a 40% aqueous solution of an ethoxylated castor oil with 200 ethylene glycol groups (HLB=18.1, obtainable under the tradename Atlas G1300 from Croda GmbH, Nettetal, Germany) were mixed. Added to this mixture within 3 min were 32 parts of isooctyltriethoxysilane and 0.2 part of aminopropyltriethoxysilane, and the mixture was stirred at 4000/min with an Ultra-Turrax® T 50 (IKA®-Werke GmbH & Co. KG, Staufen, Germany) for a further 3 min. Within 2 min, 15 parts of dispersion A1 were added and the mixture was homogenized for a further two minutes. The emulsion was diluted with 45 parts of purified water, and preservation was effected with 0.63 part of cetyltrimethylammonium chloride (obtainable under the tradename Genamin CTAC from Clariant GmbH) and with 0.2 part of Acticide BX (N) (preservative from Thor Chemie GmbH Speyer). Added to this emulsion are another 4 parts of a 50% aqueous emulsion of a polydimethylsiloxane containing amino groups having a viscosity of 500 mPas and an amine number of 0.15 meq/g (obtainable under the tradename SIL-RES® ES 1306 from WackercChemie AG, Munich, Germany). The particle size (mean of the volume distribution) of this water-dilutable oil in water emulsion was 7.0 μm. The emulsion is homogenized with a high-pressure homogenizer (APV 2000, Invensys APV Unna) at 500 bar. A mobile emulsion is obtained, which has a volume-average particle size of 0.91 μm.

The emulsion thus obtained was analyzed; the results can be found in Table 1.

Example 4

0.75 part of an ethoxylated isotridecyl alcohol with 5 ethylene glycol groups and an HLB value of 11.2 (commercially available under the tradename Lutensol TO 5 from BASF SE, Ludwigshafen, Germany) and 1.875 parts of a 40% aqueous solution of an ethoxylated castor oil with 200 ethylene glycol groups (HLB=18.1, obtainable under the tradename Atlas G1300 from Croda GmbH, Nettetal, Germany) were mixed. Added to this mixture within 3 min were 30 parts of isooctyltriethoxysilane, 7 parts of a methylsilicone resin consisting of 90 mol % of MeSiO$_{3/2}$ units and 10 mol % of Me$_2$SiO$_{2/2}$ units, with a weight-average molar mass Mw of 6700 g/mol, a viscosity of 3380 mPas and a content of ethoxy groups of 3.1% by weight and of hydroxyl groups of 0.57% by weight, as is 0.2 part of aminopropyltriethoxysilane, and the mixture is stirred with an Ultra-Turrax® T 50 (IKA®-Werke GmbH & Co. KG, Staufen, Germany) at 4000 min for a further 3 min. Within 2 min, 10 parts of dispersion A2 were added and the mixture was homogenized for a further two minutes. This emulsion was diluted with 46 parts of purified water and preserved with 0.2 part of a preservative (obtainable under the tradename Acticide BX (N) from Thor Chemie GmbH, Speyer, Germany). Added to this emulsion are another 4 parts of a 50% aqueous emulsion of a polydimethylsiloxane containing amino groups having a viscosity of 500 mPas amine number of 0.15 meq/g (obtainable under the tradename SIL-RES® BS 1306 from Wacker Chemie AG, Munich, Germany). The particle size of the (mean of volume distribution) of this water-dilutable oil-in-water emulsion was 5.2 μm. The emulsion is homogenized with a high-pressure homogenizer (APV 2000, Invensys APV, Unna, Germany) at 500 bar.

A mobile emulsion is obtained, having a volume-average particle size of 0.92 μm.

The emulsion thus obtained was analyzed; the results can be found in Table 1.

Example 5

The process described in Example 3 is repeated, with the alteration that no cetyltrimethylammonium chloride is added. Upstream of the high-pressure homogenizing, the emulsion had a volume-average particle size of 4.2 μm, and of 1.13 μm thereafter.

The emulsion thus obtained was analyzed; the results can be found in Table 1.

Example 6

26 kg of an ethoxylated isotridecyl alcohol with 5 ethylene glycol groups and an HLB value of 11.2 (commercially available under the tradename Lutensol TO 5 from BASF SE, Ludwigshafen, Germany) and 48 kg of a 50% aqueous solution of an ethoxylated castor oil with 200 ethylene glycol groups (HLB=18.1, obtainable under the tradename Atlas G1300 from Croda GmbH, Nettetal, Germany) were mixed. Added to this mixture within 10 min were 1050 kg of isooctyltriethoxysilane and 6.4 kg of aminopropyltriethoxysilane, and the mixture was mixed with a 3.5 m³ stirrer system with rotor-stator homogenizer from Ekato-Unimix for a further 10 min. Within 20 min, 480 kg of dispersion A1 were added and the mixture was homogenized for a further 20 minutes. This emulsion was diluted stepwise with 1326 kg of purified water. 67 kg of 30% cetyltrimethylammonium chloride solution (obtainable under the tradename Genamin CTAC from Clariant GmbH) and 5 kg of a preservative (obtainable under the tradename Acticide BX (N) from Thor Chemie GmbH, Speyer, Germany) were added. Added to this emulsion are another 191 kg of a 50% aqueous emulsion of a polydimethylsiloxane containing amino groups with a viscosity of 500 mPas and an amine number of 0.15 meq/g (obtainable under the tradename SILRES® BS 1306 from Wacker Chemie AG, Munich, Germany). The particle size (mean of the volume distribution) of this water-dilutable oil-in-water emulsion was 4.71 μm. The emulsion was transferred to a stirred tank and then homogenized with a high-pressure homogenizer (APV Gaulin GmbH, model: 264 MC 15-10TBS) at 250 bar and, in the course of this, transferred into a second tank. A mobile emulsion is obtained, which has a volume-average particle size of 1.07 μm.

The emulsion thus obtained was analyzed; the results can be found in Table 1.

TABLE 1

| Example | D[4, 3] in μm | D[4, 3] in μm after heated storage | Depositions in the course of centrifugation | Depositions after heated storage | Alkyltrialkoxysilane after heated storage |
|---|---|---|---|---|---|
| 3 | 0.91 | 0.99 | 5% | 2% | 98% |
| 4 | 0.92 | 0.98 | 6% | <1% | 100% |
| 5 | 1.13 | 1.18 | 6% | 1% | 99% |
| 6 | 1.00 | 1.07 | 6% | 1% | 100% |

Comparative Example 1

The process described in Example 6 is repeated, with the alteration that, rather than 480 kg of mixture A1, 320 kg parts of polydimethylsiloxane with trimethylsilyl end groups having a viscosity of 1000 mPas and 160 kg of a hexadimethyldisilazane-treated silica having a BET surface area of 130 m²/g, a carbon content of 2.1% and a hydrophobicity by methanol titration of 62 were added successively and mixed together with the silane. Prior to the high-pressure homogenization, no particle size was measurable, since the emulsion could not be diluted homogeneously with water. In spite of constant stirring, the emulsion separated as early as the first storage tank and, even after attempted homogenization with the high-pressure homogenizer, showed an inhomogeneous appearance. Further tests were therefore impossible.

Example 7

Performance Testing

The dispersions according to Examples 1 to 3 were used for impregnation of mortar disks. To produce the mortar disks, 2700 g of standard sand (from Normensand GmbH, 59269 Beckum (near Münster), Germany), 900 g of PZ 450 Z white cement (from Dyckerhoff Zementwerke AG, 65203 Wiesbaden, Germany) and 450 g of tap water were mixed. Subsequently, the mixture is poured into plastic rings (diameter 8.5 cm, height 2 cm) on a polymer film. For compaction and removal of air inclusions, a palette knife is frequently pushed into the material, then the palette knife is used to remove the excess of the concrete mixture. The samples are covered with a film and cleaned at the edges. Before use, the specimens have to be stored under standard climatic conditions (23° C., 50% rel. air humidity) for at least 3 months. Immediately prior to use, the top side of the samples is sand-blasted to remove the cement interlayer.

Prior to impregnation, these mortar disks thus obtained are immersed into deionized water for 2 minutes and stored at room temperature packaged in film for 12 hours. Subsequently, they are stored under standard climatic conditions (23/50) unpackaged for 2 hours and, after determining the starting weight (W1), impregnated. This is done by immersing the specimens into the inventive dispersion for 1 minute (under about 5 cm of liquid). The dispersions according to Examples 3 and 4 are used for impregnation in concentrated form, and the dispersions according to Example 5 in 1:4 dilution with water. Now the specimens are reweighed (W2) and the difference (W2-W1) is used to determine the impregnation medium absorption. For development of hydrophobic effect, the samples are stored under standard climatic conditions (23/50) for 14 days. Then the specimens are weighed again (W5) and placed into deionized water for 24 h (under 5 cm of water). The water absorption is determined by weighing (W6) and the percentage water absorption is calculated by (W6-W5)/W5×100.

The bead-off effect was assessed visually after the specimen had been sprayed with water, using a scale of 1-5:
1=very good, i.e. no wetting of the building material surface with water, and no water droplets remain suspended on the building material surface
2=good, i.e. likewise no wetting, isolated water droplets remain suspended but can be removed easily by shaking them off
3=lightly wetted, i.e. drops running off slightly wet the building material surface
4=significantly wetted, i.e. there is almost no formation of droplets running off
5=wetted completely like untreated specimen The results (mean values for 3 mortar disks in each case) are shown in Table 2:

TABLE 2

| | Performance tests | |
|---|---|---|
| Example | Water absorption in % | Bead-off effect |
| 3 | 0.60 | 1 |
| 4 | 0.68 | 2 |
| 5 | 0.66 | 1 |
| 6 | 0.67 | 2 |
| untreated | 5.59 | 5 |

The invention claimed is:
1. An aqueous dispersion of organosilicon compounds, comprising:
(A) a mixture consisting essentially of inorganic filler (B) and siloxane (C) containing units of the formula (I)

in which
R are the same or different and are hydrogen or a monovalent, SiC-bonded, optionally substituted hydrocarbyl radical, $R^1$ are the same or different and are hydrogen, or a monovalent, optionally substituted hydrocarbyl radical, a is 0, 1, 2 or 3, and b is 0, 1, 2 or 3, with the proviso that the sum of a and b is less than or equal to 3, and the siloxane (C) has a viscosity at 25° C. of 5 to 1,000,000 mPas, the mixture (A) having a viscosity of 10 to 10,000,000 mPas at 25° C., and filler (B) comprising silica, (D) silanes of the formula

$$R^3{}_c R^2{}_d Si(OR^4)_{4-c-d} \quad (II)$$

in which $R^2$ are the same or different and denote monovalent, SiC-bonded, optionally substituted hydrocarbyl radicals having 1 to 3 carbon atoms, $R^3$ are the same or different and denote monovalent, SiC-bonded, optionally substituted hydrocarbyl radicals having at least 4 carbon atoms, which may be interrupted by heteroatoms and/or carbonyl groups, $R^4$ are the same or different and denote monovalent, optionally substituted hydrocarbyl radicals or hydrogen, c is 1, 2 or 3, and d is 0, 1 or 2, with the proviso that the sum of c and d is 1, 2 or 3, and/or partial hydrolysates thereof, (E) optionally organopolysiloxanes, (F) emulsifier, (G) water, and (H) optionally further substances.

2. The aqueous dispersion of claim 1, wherein mixture (A) comprises filler (B) in amounts of 1 to 60 parts by weight, based on 100 parts by weight of mixture (A).

3. The aqueous dispersion of claim 2, comprising mixture (A) in amounts of 2 to 40% by weight, based on the total amount of the dispersion.

4. The aqueous dispersion of claim 1, comprising mixture (A) in amounts of 2 to 40% by weight, based on the total amount of the dispersion.

5. A process for producing an aqueous dispersion of organosilicon compounds of claim 1, in which a mixture (A) produced by mixing inorganic filler (B) and siloxane (C) is mixed with silanes (D) and/or partial hydrolysates thereof, and with (E) optionally organopolysiloxanes, (F) emulsifier, (G) water, and (H) optionally further substances.

6. The process of claim 5, wherein one or more emulsifiers are present, and the emulsifiers are selected from the group consisting of non-ionic emulsifiers.

7. The process of claim 5, wherein components (F) and a portion of component (G) are initially charged, components (A), (D), optionally (E) and optionally (H) are added successively or together and mixed homogeneously, and then the residual amounts of components (G) are added, mixed and homogenized.

8. The aqueous dispersion of claim 1, wherein one or more emulsifiers are present, and the emulsifiers are selected from the group consisting of non-ionic emulsifiers.

\* \* \* \* \*